United States Patent [19]

Buckley et al.

[11] 4,189,948
[45] Feb. 26, 1980

[54] PERMANENT MAGNET TORQUER FOR FREE ROTOR FLEXURE SUSPENDED GYROSCOPES

[75] Inventors: Charles G. Buckley; James A. Kiedrowski, both of Phoenix, Ariz.

[73] Assignee: Sperry Corporation, New York, N.Y.

[21] Appl. No.: 818,486

[22] Filed: Jul. 25, 1977

[51] Int. Cl.² ............................................. G01C 19/30
[52] U.S. Cl. ........................................ 74/5.46; 74/5.7; 74/5.6 E
[58] Field of Search .............. 74/5.6 E, 5.6 D, 5.6 R, 74/5.47, 5.46, 5.41, 5.4, 5 R; 310/156

[56] References Cited

U.S. PATENT DOCUMENTS

| | | | |
|---|---|---|---|
| 2,503,346 | 4/1950 | Meredith | 310/156 X |
| 3,215,876 | 11/1965 | Nichols et al. | 310/156 |
| 3,218,494 | 11/1965 | Bacon et al. | 310/156 |
| 3,438,270 | 4/1969 | Binder et al. | 74/5.47 |
| 3,452,609 | 7/1969 | Goodhue et al. | 74/5.6 E |
| 3,470,408 | 9/1969 | Lewis et al. | 310/156 X |
| 3,529,477 | 9/1970 | Quermann | 74/5 F |
| 3,557,629 | 1/1971 | Quermann | 74/5.6 D |
| 3,696,260 | 10/1972 | Lace | 310/156 |
| 3,702,569 | 11/1972 | Quinn et al. | 74/5.47 |
| 3,849,682 | 11/1974 | Binns | 310/156 |
| 3,956,650 | 5/1976 | Field | 310/156 |

*Primary Examiner*—Samuel Scott
*Assistant Examiner*—Don E. Ferrell
*Attorney, Agent, or Firm*—Howard P. Terry

[57] ABSTRACT

A permanent magnet, direct current torquer for a gyroscope of the two-degree-of-freedom, free-rotor, force-rebalanced type includes a primary magnetic circuit having axially polarized permanent magnets, preferably of the samarium cobalt type, and flux focusing means cooperating therewith for directing the axial flux thereof in a radial direction for reaction with fields of concentric, axially-effective, frame-mounted torquing coils. The focusing means includes secondary annular axially-polarized magnets and a further magnetic circuit to minimize leakage flux. The primary and secondary annular magnets closely surround the rotor axis so that the amount of inertia of the rotor is minimized, desirably improving the sensitivity of the instrument.

4 Claims, 4 Drawing Figures

PERMANENT MAGNET TORQUER FOR FREE ROTOR FLEXURE SUSPENDED GYROSCOPES

BACKGROUND OF THE INVENTION

1. Field of the Invention

The present invention relates generally to gyroscopic instruments and is more particularly concerned with two-degree-of-freedom, force-rebalanced, flexure-suspended, free-rotor gyroscopes such as are employed, for example, in strapped-down gyroscopic reference apparatus. More specifically, the invention relates to improved torque motor arrangements for providing a rebalancing force.

2. Description of the Prior Art

Typical flexure-suspended free-rotor gyroscopic devices are disclosed in U.S. patents and pending patent applications assigned to Sperry Rand Corporation including:

W. G. Wing—U.S. Pat. No. 2,719,291—"Rate of Turn Gyroscope" issued Sept. 27, 1955, T. R. Quermann—U.S. Pat. No. 3,529,477—"Gyroscopic Rotor Suspension" issued Sept. 22, 1970, T. R. Quermann—U.S. Pat. No. 3,557,629—"Pick-Off and Torquing Device" issued Jan. 26, 1971, and T. R. Quermann—U.S. Pat. No. 3,677,097—"Protective Stops For Flexure Suspended Gyroscopic Rotor" issued July 18, 1972.

These patents disclose concepts typical of the continuing trend in the design of gyroscopic instruments to achieve smaller, less expensive, and more reliable gyroscopic apparatus for employment in flight control and other precision navigation and stabilization applications, as do the following pending patent applications:

T. R. Quermann—Ser. No. 741,916—"Pick-Off, Torquer, and Reference Signal Generator for Free Rotor Gyroscopes" filed Nov. 15, 1976, and T. R. Quermann—Ser. No. 742,158—"Flexure Suspensions for Free Rotor Gyroscopes" filed Nov. 15, 1976.

Since they deal particularly with direct current torquer arrangements for flexure-mounted gyroscopes, the Quermann U.S. Pat. No. 3,557,629 and his application Ser. No. 741,916 are of certain interest with respect to the present invention.

While some early versions of such gyroscopic instruments have required either separate pick-offs or rotary transformers and resolvers, such elements representing complex and expensive expedients unsuited for use wherever compactness of design is a requisite, Quermann in U.S. Pat. No. 3,557,629 sought to overcome the problems of the prior art in providing an integrated pick-off, torquer, and reference signal generator system for flexure suspended gyroscopes. Pick-off coils are mounted on the instrument housing, thus eliminating the need for expensive resolver apparatus, and second parts of the pick-off are located on the gyroscope rotor drive shaft. The torquing function is made generally integral with the pick-off function, thereby making the configuration relatively more compact in some designs than devices requiring fully separated pick-offs and torquers. However, a large number and complex arrangement of coils is required in the pick-off coil assembly, as well as complex magnetic circuits difficult specifically to design to minimize external flux leakage and, in general, difficult to machine and to assemble. It is also found to be difficult in some applications to eliminate all coupling or cross-talk between torquer and pick-off circuits. More important, it is critical that leakage flux, both internal and external of the gyroscope, which can disadvantageously couple with adjacent magnetic material as well as with the earth's magnetic field, be kept at an absolute minimum.

In the aforementioned pending Quermann application Ser. No. 741,916, many of the problems of the device of U.S. Pat. No. 3,557,629 were overcome to a significant extent in certain applications by integrating the pick-off, torquer, and rotor speed reference signal functions in a single rotating configuration. The three gyroscopic functions are combined in a single coil assembly using a radially magnetized ring located on the gyroscope rotor wheel with a plurality of pick-off coils mounted compactly with respect to the instrument case, each partially inserted in an air gap provided at the gyroscope rotor wheel periphery. The spacial flux variation around the rotor wheel in the air gap generates an alternating current in each pick-off coil as the rotor spins. The difference in the voltages induced in diametrically opposed pick-off coils provides an output signal, while the sum of the signals induced in all coils provides an alternating phase and frequencey reference voltage. Since there is a finite unidirectional magnetic field in the air gap, controlled direct currents may be applied to the pick-off coils for torquing the gyroscope rotor without inducing spurious error signals in the pick-off system.

In some applications, it remains attractive, however, to separate the several electrical functions associated with the flexure-mounted rotor in the interest of minimizing its inertia so as to maximize fully the sensitivity of the instrument, and to provide a cost-effective yet efficient design. Furthermore, in some applications, it is desirable to assure a cost effective instrument by making certain that all parts may be economically made or purchased as non-highly specialized parts. For example, the ring magnets used in the instrument of application Ser. No. 741,916 are radially polarized; while such annular magnets are possible to obtain, they are expensive and are not as readily available as are high intensity annular magnets polarized in the axial direction, such as annular magnets constructed of samarium-cobalt magnetic alloy. In the particular application of a rate gyroscopic instrument for a craft with very high turning rate capability; i.e. on the order of 300 degrees per second, the torquer must be fully capable of exerting correspondingly very high precession torques on the rotor with respect to the instrument case. Samarium-cobalt magnet material is particularly useful because of its very high flux density and high demagnetization capability, permitting higher torque command currents. Furthermore, since the magnetic circuit design of the present torquer minimizes flux external leakage, the flux density across the gap may be substantially increased by use of samarium-cobalt magnets.

SUMMARY OF THE INVENTION

The invention is an improved torque motor configuration for miniature two-degree-of-freedom, force-rebalanced, free-rotor gyroscopes having novel features for overcoming the defects of the prior art. The invention finds application in gyroscopes in which the rotor is spun about a spin axis by means of a cooperating motor and drive shaft. In a preferred embodiment, a flexure support system radially and axially supports the gyroscope rotor wheel coaxially on the drive shaft for universal tilting or precession over a predetermined angular range about a pair of axes perpendicular to the spin axis. It will be understood, however, that the invention is applicable in free rotor gyroscopes employing other types of suspensions such as fluid, pneumatic, magnetic, and the like. The novel dual-axis torquer system includes a magnetic circuit having a primary axially-polarized, annular permanent magnet which cooperates with the magnetic flux focusing means to direct the resultant flux radially across the conductors of radially disposed, frame-mounted, torquing coils. The space quadrature torquer coils are advantageously mounted external of the annular magnet system and of the major parts of the rotatable magnetic circuit forming the primary parts of the gyroscope rotor. Thus, the moment of inertia of the rotating system is reduced, ensuring high sensitivity for the instrument. The flux focusing means includes secondary annular axially-polarized magnets and a magnetically soft ring mounted on the rotor at each side of the primary annular magnets, the secondary magnet poles opposing those of the primary magnet whereby to increase the efficiency of the magnetic circuit, greatly reducing magnetic flux leakage or wasted flux while maintaining the desired high magnetic flux density through the torquing coils, all annular magnets being internally disposed relative to the coils so as to minimize rotor inertia.

DESCRIPTION OF THE PREFERRED EMBODIMENTS

Figure 1:
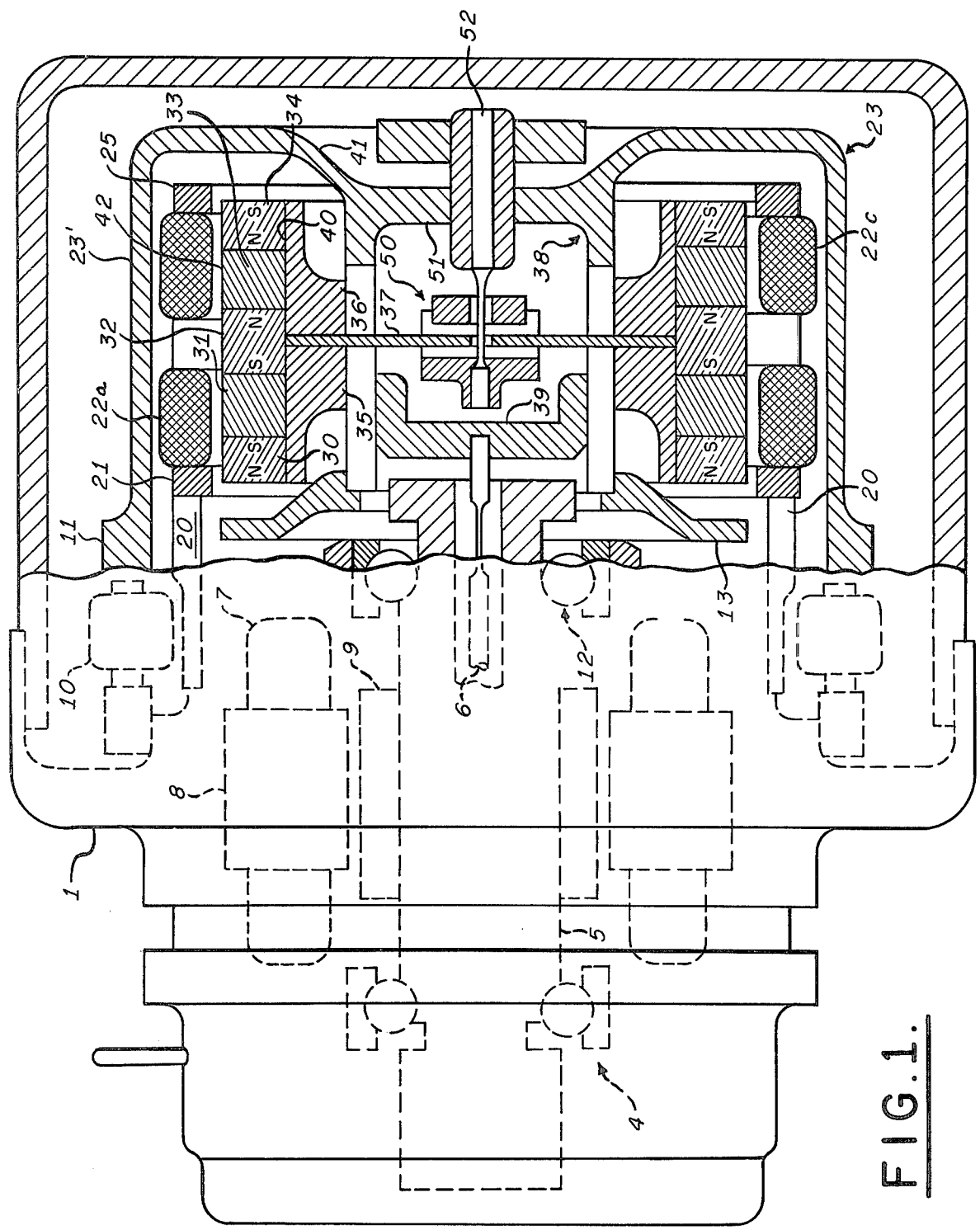
FIG. 1 is an elevation view of a free-rotor gyroscope partly in cross section and illustrating the novel free rotor torquer system.
Figure 2:
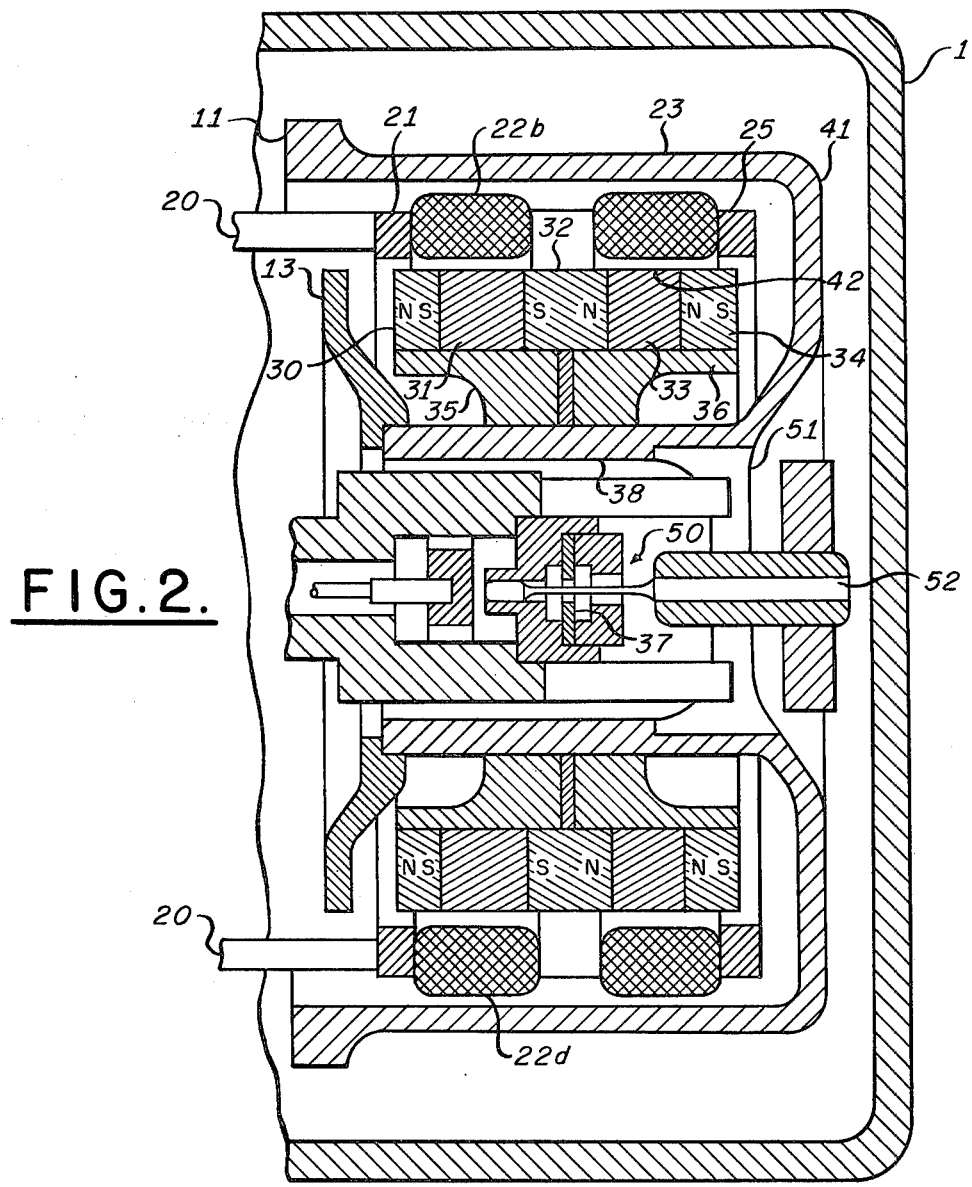
FIG. 2 is a fragmentary cross section view taken at ninety degrees to the section of FIG. 1.

Referring to FIGS. 1 and 2, a gyroscope according to the present invention is generally similar to those shown in detail in the aforementioned Quermann U.S. Pat. Nos. 3,529,477 and 3,557,629. Similar elements are shown in dotted lines and include a housing 1 within which are mounted anti-friction bearings 4 and 12 that journal a hollow drive shaft 5 about its geometrical spin axis. Drive shaft 5 is rotated by a generally conventional spin motor having a stator 8 and excitation coil 7 and a rotor 9 all as described in the aforementioned patents, for example. As shown in full lines, a gyroscopic rotor wheel 23 is radially suspended by a flexure support system 50 having four equiangularly disposed resilient thin flat arms 37 flexibly supporting gyroscopic rotor 23 for rotation about the normal spin axis upon shaft 5. Gyroscope rotor 23 is supported in the spin axis direction by a further flexure support strut 52, the longitudinal strut axis extending through an aperture in the radial flexure system 37. Flexure support strut 52 has an extension 6 into hollow shaft 5 whereby it is affixed within shaft 5. The flexure support system 6, 37, 50 is similar to flexure support systems disclosed in the aforementioned issued patents. Since the flexure support is very similar to and fully described in the aforementioned Quermann patents, further description herein is omitted in the interest of brevity. Suffice it to say that the flexure suspension of the rotor is such as to provide a substantially zero angular spring rate so that the gyroscope rotor is in essence a free rotor. Since the gyroscope is of the force-rebalance type, signals representative of the degree of tilt of rotor 23 about a pair of mutually perpendicular axes each normally perpendicular to the spin axis of hollow shaft 5 in response to rates of turn of the vehicle are derived in a conventional manner from quadrature-spaced inductive proximity sensors 10 supported on housing 1 adjacent the annular face 11 of the outer shell 23' of gyroscope rotor 23. It will be understood by those skilled in the art that these and other features of the referenced gyroscope patents may be selectively incorporated as may be required for the purposes at hand.

As shown particularly in FIGS. 1 and 2, the flexure support system 50 supports facing annular non-magnetic mirror-image clamping parts 35, 36 on the cylindrical surface of a rotor cage made up of a cylindrical shell member 38, yoke 39, and yoke 51, and clamps the suspension element 37 therebetween. It will be understood that these and other parts of the rotor and torquer may be fixed together by suitable conventional adhesives, such as materials of the epoxy type, in a manner generally described in the aforementioned patents.

The annular non-magnetic parts 35, 36 cooperate in forming a cylindrical surface 40 of sufficient axial length to support primary and secondary axially-polarized and axially-aligned annular permanent magnets and the flux housing ring used in the novel torquer. A primary annular one-piece permanent magnet 32 is affixed centrally on surface 40 and is axially polarized so that its magnetic flux extends in the axial direction, as shown in the drawings. On either side of the primary annular magnet 32, there is located a flux focusing means which includes one of a pair of magnetically-soft flux-focusing rings 31, 33 fabricated from a selected ferromagnetic material with high permeability to magnetic flux lines or lines of force, but having little or no tendency to become permanently magnetically polarized in the presence of a magnetic field. Rings 31, 33 are also affixed to the cylindrical surface 40 of members 35, 36 in any convenient manner. The flux focusing means further includes, against each of the exterior flat surfaces of rings 31, 33 one of a pair of secondary annular permanent magnets 30, 34, each also uniformly axially magnetized, and so oriented that their polarization is opposite to that of the primary ring 32.

The flexibly-mounted rotor 23 further includes, as seen most clearly in FIG. 2, an end bell 41 which may be integral with cylindrical shell 38 and which, in turn, is integral with the outer cylindrical shell 23' of the gyroscopic rotor. The inner diameter of the outer shell 23' and the outer diameter of cylindrical surface 42 of the annular permanent magnet system are spaced apart to form a gap in which coils 22a, 22b, 22c, 22d, which are secured to the gyroscope housing, may be accommodated, as will be further described. An inner end bell part 13 is supported by cylindrical cage 38 at its end opposite end ball 41. The cooperating portions 13, 38, 41, 23' of the rotor system make up parts of two cooperating, substantially closed magnetic circuits, as will be further described, and are again constructed of a magnetically soft material, such as iron, that is highly permeable to magnetic flux.

Figure 3:
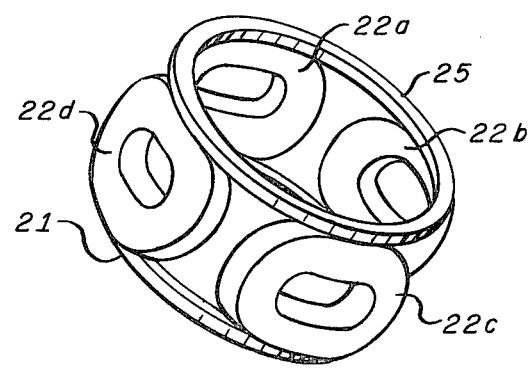
FIG. 3 is a perspective view of torquing coil elements of the gyroscope.

As seen in FIGS. 1 and 2 and especially in FIG. 3, four multi-turn torquer coils 22a, 22b, 22c, 22d are disposed in the annular space between surface 42 and the interior surface of rotor shell 23'. These are disposed in 90° angular spaced relation and are energized by torquing control currents generated in response to turn induced precession of the rotor as detected by pick-off 10. The several coils have equal impedances and generate substantially equal magnetic fields when torquing currents are passed through them, the opposed coils 22a, 22c being coupled in series for torquing the rotor about one axis and the opposed coils 22b, 22d being coupled in series relation for torquing the rotor about an axis perpendicular to the one axis, whereby the rotor precession is nulled and the torquer currents are proportional to vehicle turn rate. Coils 22a, 22b, 22c, 22d may conveniently be mounted in non-magnetic support rings 21, 25 by the use of an appropriate adhesive. The rings 21, 25 are preferably fabricated from a non-magnetic metal having high electrical resistivity to assure zero coupling with the magnet fields and also low thermal resistivity to assist in coil cooling, such as a beryllium-copper or brass alloy and are supported from casing 1, as by cantilevers 20.

Figure 4:
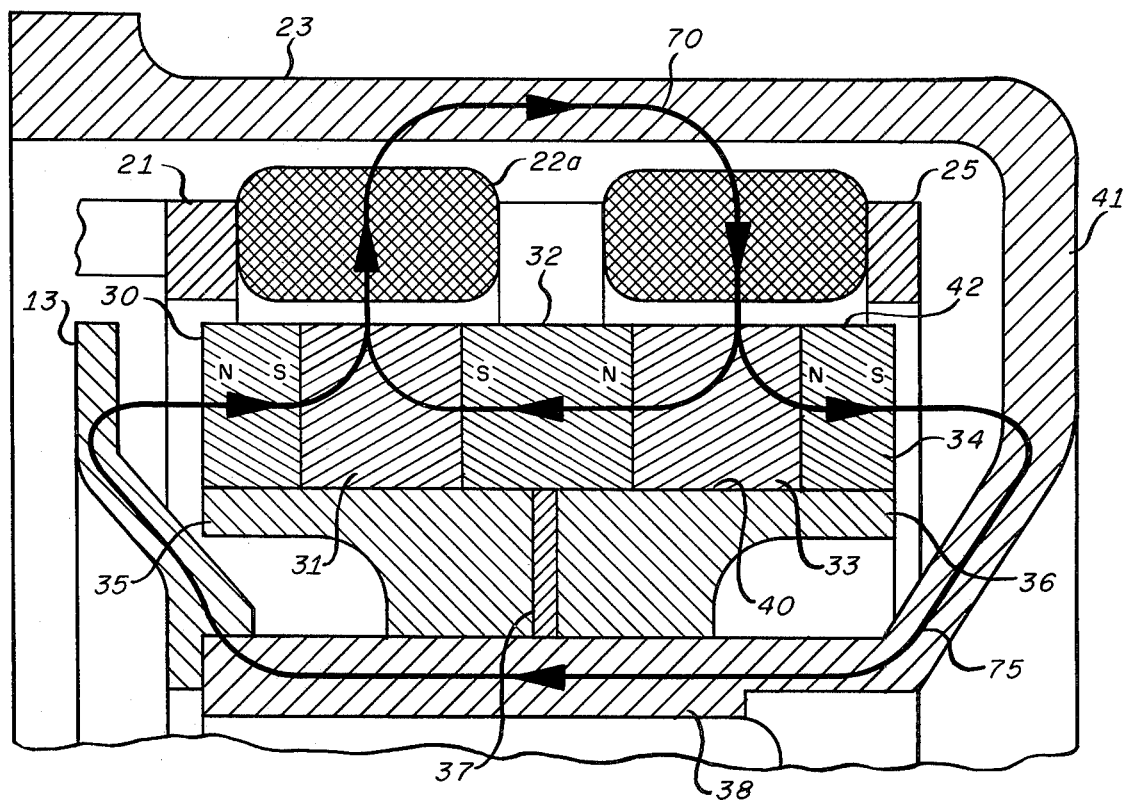
FIG. 4 is a fragmentary cross section view of part of the torquer configuration showing the principal paths of the magnetic flux.

The novel rotor and torquer system utilizes the novel, substantially closed magnetic circuits illustrated in FIG. 4 to minimize leakage fluxes exterior of the housing. A first magnetic flux loop 70 is formed in part by magnetic lines of force originated by the primary annular magnet 32 that pass from magnet 32 into the flux focusing ring 31 and through coil 22a, for example, then through part of the high permeability outer shell 23 and back through coil 22a into the similar ring 33 and thence to annular magnet 32. The opposed fluxes of the two secondary annular magnets 30 and 34 cooperate with the fluxes of the primary magnet 32 and rings 31 and 33 to focus the resultant flux radially across the coil gap, as shown by flux loop 70, thereby producing a concentrated magnetic field in the gap occupied by the several torquer coils. Additionally, the secondary annular magnets 30, 34 cooperate with the high permeability magnetic circuit rotor members 13, 38, 41 in a manner effectively to capture substantially the entire magnet field and thereby to prevent radiation of undesired stray magnetic fields outside of housing 1. Such lines of force that would otherwise generate undesirable stray magnetic fields pass in a second loop 75 from secondary ring magnet 34, for instance, into the high permeability end bell 41 and through the high permeability shell 38, high permeability end bell 13, the secondary annular magnet 30, part of loop 70, and back into secondary magnet 34. Accordingly, the novel compact and confined magnetic flux circuit of the invention not only minimizes undesirable stray magnetic fields, but desirably tends to focus and to intensify the magnetic field passing through the torquer coils 22a, 22b, 22c, 22d in the interest of maximizing torquer sensitivity and efficiency.

Radially magnetized magnets, if of samarium-cobalt, are usually economically available only in arcuate segments for assembly into a radially magnetized ring and these are avoided, along their attendant expense. Furthermore, some torquer configurations employing radially polarized magnets require that at least some of them be supported on rotating parts exterior of the torquer coils, thus undesirably increasing rotor inertia. With the present invention, the difficulties of the prior art are overcome and the moment of inertia is minimized and, significantly, the leakage flux exterior of the housing is reduced to an absolute minimum. The torquer configuration contributes to the realization of a small and compact gyroscope structure. For example, in a typical form of the invention using a case only 2.00 inches in diameter and 2.38 inches long with a total weight of 0.7 pounds, the suspended rotor weight is 0.15 pounds with an angular momentum of 84,400 dyne centimeter seconds. The instrument readily demonstrates the capability of nulling the rotor position for craft turn rates of 300° per second and greater.

While the invention has been described in its preferred embodiments, it will be understood that the words which have been used are words of description rather than of limitation and that changes within the purview of the appended claims may be made without departure from the true scope and spirit of the invention in its broader aspects.

We claim:

1. In gyroscopic apparatus:

housing means, drive shaft means journalled in said housing means, rotor means adapted for spinning about a spin axis by means of said drive shaft means, means for supporting said rotor means for tilting about first and second tilt axes substantially perpendicular to said spin axis, inner cylindrical shell means forming a first portion of said rotor means, outer cylindrical shell means forming a second portion of said rotor means, primary annular axially magnetized magnet means supported on said rotor means coaxially between said inner and outer cylindrical shell means spaced apart from said outer cylindrical shell means and forming a radial cylindrical gap with respect to said outer cylindrical shell means, first and second annular magnetizable flux focusing means supported on said rotor means axially adjacent said primary magnet annular means for directing its axial magnetic flux radially across said radial cylindrical gap, secondary annular axially magnetized means adjacent said first and second annular flux focusing means, said secondary annular axially magnetized magnet means being polarized so as to oppose the axial flux of said primary annular magnet means for further focusing the flux of said primary annular magnet means radially across said radial cylindrical gap, and energizable cell assembly means disposed within said radial cylindrical gap for torquing said rotor means with respect to said housing means about said first and second tilt axes in response to tilt thereof.

2. Apparatus as described in claim 1 wherein said coil assembly means includes a plurality of equiangularly-spaced discrete coil means each disposed with said radial cylindrical gap in an annular array and each including portions cooperative with the flux focused by said first and second annular flux focusing means.

3. Apparatus as described in claim 2 wherein each said discrete coil means is substantially rectangular and opposed, substantially-parallel portions thereof lie in an arcuate plane substantially conformal with a predetermined section of said radial cylindrical gap and adjacent said first and second flux forming means.

4. Apparatus as described in claim 1 further including magnetically permeable means generally radially extending from said inner cylindrical shell means and cooperative with said secondary annular axially magnetized magnet means closing the magnetic flux path of said secondary magnet means.

* * * * *